(12) United States Patent
Dworak et al.

(10) Patent No.: US 6,423,771 B1
(45) Date of Patent: Jul. 23, 2002

(54) AQUEOUS COATING COMPOSITION

(75) Inventors: Gert Dworak; Wrner Staritzbichler, both of Graz (AT)

(73) Assignee: Solutia Austria GmbH, Werndorf (AT)

( * ) Notice: Subject to any disclaimer, the term of this patent is extended or adjusted under 35 U.S.C. 154(b) by 0 days.

(21) Appl. No.: 09/723,296

(22) Filed: Nov. 27, 2000

(30) Foreign Application Priority Data

Dec. 23, 1999 (AT) .............................................. 2171/99

(51) Int. Cl.$^7$ ................................................ C08L 51/00
(52) U.S. Cl. ...................................... 524/501; 524/537
(58) Field of Search ................................ 524/501, 537

(56) References Cited

U.S. PATENT DOCUMENTS

| | | | | |
|---|---|---|---|---|
| 4,113,793 A | * | 9/1978 | Sekmakas | .................... 260/850 |
| 4,284,544 A | | 8/1981 | Wegner et al. | |
| 4,451,597 A | * | 5/1984 | Victorius | ...................... 524/39 |
| 4,968,536 A | | 11/1990 | Goldner et al. | |
| 5,210,154 A | | 5/1993 | Weidemeier et al. | |
| 5,260,138 A | * | 11/1993 | Hohlein | ....................... 428/480 |
| 5,294,665 A | | 3/1994 | Pedain et al. | |
| 5,387,367 A | | 2/1995 | Haeberle et al. | |
| 5,455,297 A | | 10/1995 | Pedain et al. | |
| 5,521,247 A | | 5/1996 | Dobler et al. | |
| 5,525,370 A | * | 6/1996 | Hoebeke | ...................... 427/195 |
| 5,601,878 A | * | 2/1997 | Kranig | ........................ 427/386 |
| 5,663,233 A | * | 9/1997 | Bederke | ...................... 525/173 |
| 5,681,890 A | * | 10/1997 | Tanaka | ........................ 524/539 |
| 5,852,120 A | | 12/1998 | Bederke et al. | |
| 5,977,247 A | | 11/1999 | Schafheutle et al. | |
| 6,204,332 B1 | * | 3/2001 | Wilfinger | .................... 525/221 |

FOREIGN PATENT DOCUMENTS

| | | |
|---|---|---|
| AT | 328 587 | 3/1976 |
| CA | 2033530 | 7/1991 |
| DE | A 38 05 629 | 5/1989 |
| DE | 38 05 629 | 5/1989 |
| DE | A 38 13 866 | 11/1989 |
| DE | A 39 18510 | 12/1990 |
| DE | A 44 13 059 | 1/1996 |
| EP | 0 012 348 | 6/1980 |
| EP | A 0 249 727 | 12/1987 |
| EP | 0 424 697 | 5/1991 |
| EP | A 486 881 | 5/1992 |
| EP | 0 524 511 | 1/1993 |
| EP | A 0 548 873 | 6/1993 |
| EP | 0 566 953 | 10/1993 |
| EP | 0 576 952 | 1/1994 |
| EP | A 0 594 685 | 5/1994 |
| GB | 1 475 348 | 3/1976 |
| GB | A 1475348 | 6/1977 |
| WO | WO 00/59977 | 10/2000 |

* cited by examiner

Primary Examiner—Paul R. Michl
(74) Attorney, Agent, or Firm—ProPat, L.L.C.

(57) ABSTRACT

Coating composition especially for preparing automotive surfacers, comprising a condensation product A of a carboxyl group-containing resin A1 and a hydroxyl group-containing resin A2, a curing agent C which becomes active only at an elevated temperature of at least 80° C., with the proviso that at least 20% of the mass of the curing agent C is insoluble in water, and a low molar mass polyester B having a hydroxyl number of from 100 to 450 mg/g and a Staudinger Index of from 2.5 to 6 cm$^3$/g, obtainable by condensing aliphatic polyols B1 and aliphatic, cycloaliphatic or aromatic polycarboxylic acids B2, the average functionality (number of the hydroxyl groups and/or acid groups per molecule) of component B1 being greater by at least 0.2 than that of component B2.

10 Claims, No Drawings

AQUEOUS COATING COMPOSITION

BACKGROUND OF THE INVENTION

1. Field of the Invention

The invention relates to an aqueous coating composition suitable in particular for producing coatings on automobile parts. The parts thus coated, especially those where the coating composition described here is used as surfacer coat, are notable for high stone-chip resistance.

2. Description of the Related Art

DE-A 39 18 510 describes conventional baking surfacers based on polyesters and blocked isocyanates (dissolved in organic solvents). There was a need to produce equivalent coatings using aqueous systems.

EP-A 0 249 727 describes aqueous surfacer coating compositions based on phosphoric-acid-modified epoxy resins, water-dilutable polyesters as known from AT-B 328 587, and water-dilutable melamine resins. DE-A 40 00 748 relates to aqueous surfacer coating compositions of water-dilutable hydroxyl-containing polyurethane resins, which may if desired include other, admixed binders, and aqueous amine resins as curing agents. Mixtures of water-dilutable polyurethane resins, water-dilutable, epoxy-resin-modified polyesters and optionally water-dilutable amino resins are known from DE-A 38 13 866. Other aqueous surfacer coating compositions based on carboxyl-containing polyesters or acrylic copolymers and water-soluble blocked isocyanate prepolymers, alone or in combination with water-dilutable amine resins, are described in DE-A 38 05 629. EP 0 594 685 describes the use of condensation products of carboxyl-containing polyurethane resins and hydroxyl-containing polyester resins, with or without urethane modification, together with water-insoluble blocked isocyanates for producing stoving enamels. An improvement of this formulation with reduced sensitivity to so-called over-baking is known from EP-A 0 548 873, the improvement being achieved by adding a water-soluble amine resin as crosslinker.

All of these known systems are still in need of improvement, especially as regards gloss and stone-chip resistance (especially at low temperatures).

SUMMARY OF THE INVENTION

It has now been found that by adding a water-insoluble, low molar mass polyester which is rich in hydroxyl groups to condensation products of hydroxyl group-containing and carboxyl group-containing resins, and combining this mixture with curing agents which become active on heating, it is possible to obtain coating compositions which in relation to the known systems possess, after baking, better gloss and improved stone-chip resistance even at low temperatures.

The invention accordingly provides a coating composition comprising a condensation product A of a carboxyl group-containing resin A1 and a hydroxyl group-containing resin A2, A1 preferably having an acid number of from 100 to 230 mg/g, in particular from 120 to 160 mg/g, and A2 preferably having a hydroxyl number of from 50 to 500 mg/g, in particular from 60 to 350 mg/g, a low molar mass, water-insoluble polyester B having a hydroxyl number of from 100 to 450 mg/g and a Staudinger Index ("limiting viscosity number") as determined on a solution in dimethylformamide of from 2.5 to 6 cm$^3$/g, obtainable by condensing aliphatic polyols B1 and aliphatic, cycloaliphatic or aromatic polycarboxylic acids B2, the average functionality (average number of the hydroxyl groups and/or acid groups per molecule, as applicable) of component B1 preferably being greater by at least 0.2, preferably by at least 0.3, than that of component B2, and a curing agent C which becomes active only at an elevated temperature of at least 80° C., with the proviso that at least 20% of the mass of the curing agent C is insoluble in water.

"Water-insoluble" is a term used to refer to those compounds for which, following the achievement of equilibrium at 20° C. with an amount of water the mass of which is ten times that of the compound in question, less than 5% of the mass of the compound that is used is present in solution in the aqueous phase.

The acid number is defined in accordance with DIN 53 402 as the ratio of the mass $m_{KOH}$ of potassium hydroxide required to neutralize the sample under analysis to the mass $m_B$ of this sample (mass of the solids in the sample in the case of solutions or dispersions); its customary unit is "mg/g". The hydroxyl number is defined in accordance with DIN 53 240 as the ratio of that mass $m_{KOH}$ of potassium hydroxide which has exactly the same number of hydroxyl groups as the sample under analysis to the mass $m_B$ of this sample (mass of the solids in the sample in the case of solutions or dispersions); its customary unit is "mg/g".

The formerly so-called "limiting viscosity number", called "Staudinger Index"$J_g$ in accordance with DIN 1342, Part 2.4, is the limiting value of the Staudinger function $J_v$ at decreasing concentration and shear stress, $J_v$ being the relative change in viscosity based on the mass concentration $\beta_B = m_B/V$ of the dissolved substance B (with the mass $m_B$ of the substance in the volume V of the solution); i.e., $J_v = (\eta_r - 1)/\beta_B$. Here, $\eta_r - 1$ is the relative change in viscosity, in accordance with $\eta_r - 1 = (\eta - \eta_s)/\eta_s$. The relative viscosity $\eta_r$ is the ratio of the viscosity $\eta$ of the solution under analysis and the viscosity $\eta_s$ of the pure solvent. (The physical meaning of the Staudinger Index is that of a specific hydrodynamic volume of the solvated polymer coil at infinite dilution and in the state of rest.) The unit commonly used for J is "cm$^3$/g"; formerly often "dl/g".

Further objects, features and advantages of the invention will become apparent from the detailed description of the preferred embodiments that follows.

DETAILED DESCRIPTION OF THE PREFERRED EMBODIMENTS

The condensation product A preferably has an acid number of from 25 to 75 mg/g, in particular from 30 to 50 mg/g. Its Staudinger Index ("limiting viscosity number") is usually from 10 to 20 cm$^3$/g, in particular from 12 to 19 cm$_3$/g, and with particular preference from 13 to 18 cm$^3$/g. It is prepared using components A1 and A2 in the condensation process in a mass ratio of preferably from 10:90 to 80:20, in particular from 15:85 to 40:60. The resins A1 containing carboxyl groups are preferably selected from polyester resins A11, polyurethane resins A12, the so-called maleate oils A13, the graft products A14 of fatty acids and fatty acid mixtures grafted with unsaturated carboxylic acids, and acrylate resins A15. Preferably, the acid number of the resins A1 is from 100 to 230 mg/g, in particular from 70 to 160 mg/g. Its Staudinger Index, measured in dimethylformamide as solvent at 20° C., is generally from about 6.5 to 12 cm$^3$/g, preferably from 8 to 11 cm$^3$/g.

Suitable polyester resins All may be prepared in a conventional manner from polyols A11 and polycarboxylic acids A112, where also some—preferably up to 25% of the amount of substance—of the polyols and polycarboxylic acids can be replaced by hydroxycarboxylic acids A113. By appropriate choice of the nature and amount of the starting materials A111 and A112 it is ensured that the resulting polyester has a sufficient number of acid groups, in accordance with the acid number indicated above. The polyols A111 are preferably selected from aliphatic and cycloaliphatic alcohols having 2 to 10 carbon atoms and on average at least two hydroxyl groups per molecule; glycol, 1,2- and 1,3-propanediol, 1,4-butanediol, 1,6-hexanediol, neopentyl glycol, di- and triethylene glycol, di- and tripropylene glycol, glycerol, trimethylolpropane and trimethylolethane are particularly suitable. Suitable polycarboxylic acids A112 are aliphatic, cycloaliphatic and aromatic polycarboxylic acids such as adipic acid, succinic acid, cyclohexane dicarboxylic acid, phthalic acid, isophthalic and terephthalic acids, trimellitic acid and trimesic acid, and benzophenone tetracarboxylic acid. It is also possible to use compounds having both carboxylic acid groups and sulfonic acid groups, such as sulfoisophthalic acid, for example.

Suitable polyurethane resins A12 may be prepared by reacting aliphatic polyols A121, as defined under A111, hydroxyalkanecarboxylic acids A122 having at least one, preferably two, hydroxyl groups and a carboxyl group which under esterification conditions is less reactive than adipic acid; preference is given to the use of dihydroxymonocarboxylic acids selected from dimethylol acetic acid, dimethylol butyric acid and dimethylol propionic acid; oligomeric or polymeric compounds A125 having on average at least two hydroxyl groups per molecule, which may be selected from polyether polyols A1251, polyester polyols A1252, polycarbonate polyols A1253, saturated and unsaturated dihydroxyaliphatic compounds A1254, which are obtainable by oligomerizing or polymerizing dienes having 4 to 12 carbon atoms, especially butadiene, isoprene and dimethyl butadiene, followed by functionalization in a known manner, and also polyfunctional isocyanates A123, selected preferably from aromatic, cycloaliphatic and also linear and branched aliphatic difunctional isocyanates such as tolylene di-isocyanate, bis(4-isocyanatophenyl)methane, tetramethyl-xylylene diisocyanate, isophorone diisocyanate, bis(4-isocyanatocyclohexyl)methane, hexamethylene diisocyanate and 1,6-diisocyanato-3,3,5- and -3,5,5-trimethylhexane.

Particular preference is given to those polyurethane resins A12 which are prepared by reacting a mixture of one or more polyols A121 with a hydroxyalkanecarboxylic acid A122 and at least one polyfunctional isocyanate A123 which has been at least partly blocked, usually to the extent of more than 20%, preferably to the extent of more than 35% and, in particular, to the extent of 50% or more with monohydroxy compounds A124 selected from poly-alkylene glycol monoalkyl ethers HO—($R^1$—O)$_n$—$R^2$ where $R^1$ is a linear or branched alkylene radical having 2 to 6, preferably 2 to 4 carbon atoms and $R^2$ is an alkyl group of from 1 to 8, preferably 2 to 6 carbon atoms, and oximes of aliphatic ketones having 3 to 9 carbon atoms. The degree of blocking is stated here as the ratio of the number of blocked isocyanate groups and the total number of isocyanate groups present (blocked and unblocked) in the isocyanate A123. It is further preferred to prepare the polyurethane resins A12 by reacting a mixture of a polyfunctional isocyanate and a polyfunctional isocyanate blocked as described above with the hydroxyalkane carboxylic acid A122 and the polyols A121 and A125, the mixing proportions being chosen so that each molecule of the polyurethane A12 contains on average one or more than one terminal blocked isocyanate group.

"Maleate oil" A13 is a term used to denote reaction products of (drying) oils A131 and olefinically unsaturated carboxylic acids A132, especially dicarboxylic acids. Oils used as A131 are preferably drying and semi-drying oils such as linseed oil, tallow oil, rapeseed oil, sunflower oil and cottonseed oil, having iodine numbers of from about 100 to about 180. The unsaturated carboxylic acids A132 are selected so that under the customary conditions they graft under free-radical conditions (following addition of initiators or following heating) onto the initial charge of oils with a yield (fraction of the unsaturated carboxylic acids bonded to the oil after reaction, based on the amount used for the reaction) of more than 50%. Particularly suitable is maleic acid in the form of its anhydride, as are tetra-hydrophthalic anhydride, acrylic and methacrylic acid, and also citraconic, mesaconic and itaconic acid.

Other suitable resins A14 are the graft products of fatty acids or fatty acid mixtures A141 grafted with the un-saturated acids specified under A132, said fatty acids or fatty acid mixtures A141 being obtainable in industrial amounts by saponification of fats. The appropriate fatty acids have at least one olefinic double bond in the molecule; those which may be listed by way of example include oleic acid, linoleic and linolenic acid, ricinoleic acid and elaidic acid, and also the stated technical-grade mixtures of such acids.

Further suitable resins A15 are the acidic acrylate resins obtainable by copolymerization of olefinically unsaturated carboxylic acids A151 and other vinyl or acrylic monomers A152. The carboxylic acids are those already mentioned under A132, and also vinylacetic acid and crotonic and isocrotonic acid and the monoesters of olefinically unsaturated dicarboxylic acids, such as monomethyl maleate and monomethyl fumarate, for example. Suitable monomers A152 are the alkyl esters of acrylic and methacrylic acid having preferably from 1 to 8 carbon atoms in the alkyl group, (meth)acrylonitrile, hydroxy-alkyl (meth)acrylates having 2 to 6 carbon atoms in the alkyl group, styrene, vinyltoluene, and vinyl esters of aliphatic linear and branched carboxylic acids having from 2 to 15 carbon atoms, especially vinyl acetate and the vinyl ester of a mixture of branched aliphatic carboxylic acids having on average 9 to 11 carbon atoms. It is also advantageous to copolymerize the monomers specified under A151 and A152 in the presence of compounds A153 which react with the unsaturated carboxylic acids with addition and formation of a carboxyl- or hydroxyl-functional, copolymerizable compound. Examples of such compounds are lactones A1531, which react with the carboxylic acids A151 with ring opening to form a carboxyl-functional unsaturated compound, and epoxides A1532, especially glycidyl esters of a-branched saturated aliphatic acids having 5 to 12 carbon atoms, such as of neodecanoic acid or neopentanoic acid, which react with the acid A151 with addition to give a copolymerizable compound containing a hydroxyl group. The amounts of substance of the compounds used should be such that the required acid number is reached. If this compound A153 is introduced as the initial charge and the polymerization is conducted so that this compound is used as (sole) solvent, solvent-free acrylate resins are obtained.

Suitable hydroxyl group-containing resins A2 are, in particular, polyesters A21, acrylate resins A22, polyurethane resins A23, and epoxy resins A24. The hydroxyl number of the resins A2 is generally from about 50 to 500 mg/g, preferably from about 60 to 350 mg/g, and with particular preference from 70 to 300 mg/g. The Staudinger Index, measured at 20° C. in dimethylformamide as solvent, is preferably from 8 to 13 cm$^3$/g, in particular from 9.5 to 12 cm$^3$/g.

The polyesters A21 are prepared like the component A11 by polycondensation; in this case all that is necessary is to select the nature and amount of the starting materials such that there is an excess of hydroxyl groups over the acid groups to arrive at the hydroxyl number indicated above for the condensation product. This can be achieved by using polyhydric alcohols containing on average at least two, preferably 2.1 or more, hydroxyl groups per molecule, with dicarboxylic acids or with a mixture of poly- and monocarboxylic acids containing on average not more than two, preferably from 1.5 to 1.95, acid groups per molecule. Another possibility is to use a corresponding excess of hydroxyl components (polyols) A211 over the acids A212. The polyols A211 and the polyfunctional acids A212 which are reacted in the polycondensation reaction to give the hydroxyl group-containing polyesters A21 are selected from the same groups as the polyols A111 and the acids A112. It is likewise possible here to replace some of the polyols and acids by hydroxy acids in accordance with A113. The aim is for the acid number of component A2 not to exceed 20 mg/g and to be preferably below 18 mg/g. The acid number may be reduced, for example, by reacting the condensed polyester A21 with a small amount of monofunctional aliphatic alcohols A114 under esterification conditions. The amount of alcohols A114 is such that, although the acid number is reduced below the limit, the Staudinger Index does not fall beyond the stated lower limit. Examples of suitable aliphatic alcohols are n-hexanol, 2-ethylhexanol, isodecyl alcohol and tridecyl alcohol.

The hydroxyl group-containing acrylate resins A22 are obtainable by usually free-radically initiated copolymerization of hydroxyl group-containing acrylic monomers A221 with other vinyl or acrylic monomers A222 without such functionality. Examples of the monomers A221 are esters of acrylic and methacrylic acid with aliphatic polyols, especially diols having 2 to 10 carbon atoms, such as hydroxyethyl and hydroxypropyl (meth)acrylate. Examples of the monomers A222 are the alkyl esters of (meth)acrylic acid having 1-to 10 carbon atoms in the alkyl group such as methyl, ethyl, n-butyl and 2-ethylhexyl (meth)acrylate, (meth)acrylonitrile, styrene, vinyltoluene, vinyl esters of aliphatic monocarboxylic acids having 1 to 10 carbon atoms such as vinyl acetate and vinyl propionate. Preference is also given to those acrylate resins prepared not, as is usual, in solution but instead in a bulk polymerization in which the initial charge comprises a liquid cyclic compound (see above, A153) which acts as solvent during the polymerization reaction and which by means of ring opening forms a copolymerizable compound on reaction with one of the monomers used. Examples of such compounds are glycidyl esters of α-branched aliphatic monocarboxylic acids, especially the acids or acid mixtures available commercially as neopentanoic acid or neodecanoic acid, and also lactones such as ε-caprolactone or δ-valerolactone. If these glycidyl esters are used, then during the polymerization it is necessary to use comonomers containing acid groups, such as (meth)acrylic acid, in a fraction which is at least equimolar to the amount of substance of the epoxide groups. The lactones may be used, with ring opening, both with hydroxyl group-containing comonomers and with comonomers containing acid groups.

Hydroxyl group-containing polyurethane resins A23 are obtainable in a known manner by addition reaction of oligomeric or polymeric polyols A231 selected from polyester polyols, polyether polyols, polycarbonate polyols and polyolefin polyols, and, if desired, low molar mass aliphatic diols or polyols A233 having 2 to 12 carbon atoms, such as ethylene glycol, 1,2- and 1,3-propylene glycol, 1,4-butanediol, 1,6-hexanediol, di- and triethylene and/or -propylene glycol, neopentyl glycol, trimethylolpropane, pentaerythritol, ditri-methylolpropane, and dipentaerythritol, and polyfunctional isocyanates A232, the latter being used in a substoichiometric amount such that the number of hydroxyl groups in the reaction mixture is greater than the number of isocyanate groups. Other suitable polyols are, in particular, oligomeric and polymeric dihydroxy compounds having a number-average molar mass $M_n$ of from about 200 to 10,000 g/mol. By means of polyaddition with polyfunctional, especially difunctional, isocyanates, the molecules are enlarged up to the target value for the Staudinger index of at least 8 cm$^3$/g, preferably at least 9.5 cm$^3$/g.

Epoxy resins A24 obtainable by reacting epichlorohydrin with aliphatic or aromatic diols or polyols, especially bisphenol A, bisphenol F, resorcinol, novolaks or oligomeric polyoxyalkylene glycols having 2 to 4, preferably 3 carbon atoms in the alkylene group, which have at least one hydroxyl group per epichlorohydrin molecule used. Instead of the reaction of epichlorohydrin with diols, it is also possible to prepare the appropriate epoxy resins by the so-called advancement reaction from diglycidyl ethers of diols (such as those mentioned above) or diglycidyl esters of dibasic organic acids with the stated diols. All known epoxy resins may be used here, provided they satisfy the condition for the hydroxyl number.

The oligoesters or low molar mass polyesters B are prepared by condensing polycarboxylic acids B1, preferably dicarboxylic acids, especially aromatic dicarboxylic acids, their anhydrides, or mixtures thereof, with polyols B2, especially aliphatic or cycloaliphatic polyols. The number of hydroxyl groups should exceed the number of carboxyl groups in the reaction mixture by at least 10%, preferably 20%, and in particular more than 30%. It is particularly preferred to use 3.4 hydroxyl groups or more hydroxyl groups for each two carboxyl groups. This produces polyesters having a number-average molar mass $M_n$ of from about 400 to about 5000 g/mol, preferably up to 4000, and in particular up to 2000 g/mol. The polydispersity (ratio of the weight average and the number average molar masses) of the polyesters B is preferably not more than 2.5, in particular not more than 2.2, and with particular preference from 1.5 to 2.1. The oligoesters B are preferably prepared by condensing mixtures of diols and triols, especially branched aliphatic triols, with one or more of the isomeric phthalic acids. These polyesters may also form relatively large molecules by reaction with polyfunctional, especially difunctional, isocyanates, the Staudinger Index of these polyesters, containing urethane groups, remaining in each case below 6 cm$^3$/g (measured at 20° C. in dimethylformamide as solvent). The acid number of polyesters B is preferably below 6 mg/g.

The curing agents C are preferably blocked isocyanates C1 which have not undergone hydrophilic modification (i. e. reaction with compounds imparting hydrophilicity to the reaction product, like polyethylene glycol, dimethylol propionic acid, or dimethylamino propylamine, or similar compounds)or have been so modified only to a minor extent of less than 20% of their mass. Preference is given to blocked isocyanates available in a known manner from diisocyanates such as tolylene diisocyanate, isophorone diisocyanate, bis(4-isocyanatophenyl)methane, 1,6-diisocyanatohexane, tetramethyl xylylene diisocyanate, and the allophanates, biurets or uretdiones formed from these diisocyanates, and customary blocking agents. These are, for example, linear or branched aliphatic alcohols having 3 to 20 carbon atoms, preferably 2-ethylhexanol; phenols such as phenol itself; glycol monoesters, where the glycols may also be monomeric or oligomeric alkylene glycols such as glycol itself, 1,2- and 1,3-propanediol, 1,4-butanediol, di- and triethylene glycol, di- and tripropylene glycol, and the acid being selected from aliphatic monocarboxylic acids having 1 to 10 carbon atoms, preferably acetic acid; glycol monoethers, the glycols corresponding to those mentioned above and the etherification component being selected from the aliphatic lower alcohols having 1 to 8 carbon atoms, preferably butyl glycol; or ketoximes of aliphatic ketones having 3 to 10 carbon atoms, such as butanone oxime, for example. Particular preference is given to using 3,5-dimethylpyrazole as blocking agent, since it is not toxic and does not yellow even at temperatures of 180° C. or more. The blocking agents are customarily chosen so that the cleaving temperature lies between 80 and 180° C. Particular preference is given to blocked isocyanates based on aliphatic isocyanates such as isophorone diisocyanate and 1,6-diisocyanatohexane.

As a further curing component, water-dilutable amino resins C2 (addition or condensation products of amino compounds and formaldehyde as known in the art) in a mass fraction of up to 20% based on the total mass of curing components may be used. Where a hydrophilically modified blocked isocyanate C11 is used as a constituent of the curing component C, the amount of this isocyanate C11 and the amino resin C2 must be such that the sum of the mass fractions of all water-dilutable curing components, based on the sum of masses of all curing components, does not exceed 20%.

The amino resin C2 is used preferably in partly (i. e., at least 5% of the methylol groups are etherified) or fully etherified form. Particularly appropriate are melamine resins such as hexamethoxymethyl melamine, which may also be etherified with aliphatic alcohols of from 1 to 6 carbon atoms, such as butanol or with mixtures of butanol and methanol, and also the corresponding benzoguanamine, caprinoguanamine or acetoguanamine resins.

The hydrophilically blocked isocyanates C11 which may be used in minor amounts are known, inter alia, from the following documents:

EP-A 0 424 697 relates to hydrophilic blocked isocyanates available by reacting a carboxyl group-containing polyether polyol, a diisocyanate and a blocking agent. These diisocyanates are used to impregnate fibers and subsequently to produce sheet-like structures from said fibers.

EP-A 0 524 511 relates to a process for preparing aqueous dispersions of blocked isocyanates by reacting isocyanates, hydrophilicized by means of cationic, anionic or nonionic structures, in aqueous dispersion with blocking agents.

In EP-A 0 576 952, water-soluble or water-dispersible mixtures of blocked isocyanates are described which are obtained by reacting diisocyanates, a monofunctional blocking agent for isocyanates, a hydroxycarboxylic acid, a polyol component comprising a dihydric to hexahydric alcohol having a molar mass of from 62 to 182 g/mol, and a polyester diol component having a molar mass of from 350 to 950 g/mol.

EP-A 0 012 348 relates to a process for preparing water-dispersible or water-soluble blocked polyisocyanates, where a polyfunctional isocyanate which is at least half-blocked is reacted with an amine sulfonate or with the corresponding acid.

EP-A 0 566 953 relates to water-soluble or water-dispersible blocked polyisocyanates which may be prepared from an isocyanate mixture having an average isocyanate functionality of from 2.5 to 3.5, a blocking agent and an aliphatic monohydroxycarboxylic acid.

DE-A 44 13 059 relates to water-soluble blocked polyisocyanates containing incorporated amino groups which by neutralization with acids may be converted into ammonium salt groups and which, accordingly, render the crosslinking agent hydrophilic.

EP-A 0 486 881 relates to a water-dilutable polyfunctional polyisocyanate containing free isocyanate groups. The presence of these groups. lowers the storage stability of those coating compositions which comprise these crosslinking agents.

In accordance with the teaching of these documents, the hydrophilically modified (i. e., water-soluble or water-dispersible) blocked isocyanates are obtained by reacting partly blocked polyfunctional isocyanates with hydrophilicizing compounds until all, or virtually all, of the isocyanate groups have been consumed. These hydrophilicizing compounds are selected from anionogenic compounds such as organic carboxylic, sulfonic or phosphonic acids containing at least one isocyanate-reactive group, selected preferably from hydroxyl, amino, hydrazine and mercapto groups, especially bishydroxyalkyl carboxylic acids such as dimethylolpropionic acid, the reaction products thereof with isocyanates which can be converted into the corresponding anions by addition of alkali, and from cationogenic compounds, especially organic amines containing at least one tertiary amino group and also at least one of the abovementioned isocyanate-reactive groups, where the tertiary amino group can converted into the corresponding ammonium cation by adding acids following the reaction with the isocyanate. The third possibility for hydrophilicization is the reaction of the partly blocked isocyanates with nonionic hydrophilic compounds, especially those having a sufficient content of oxyethylene groups, which, as is known, may also be present in conjunction with oxypropylene groups in the compound in question.

The resins A are prepared from the polyhydroxy components A1 and the polycarboxyl components A2 under condensation conditions, i. e., at a temperature of from 80 to 180° C., preferably between 90 and 170° C., preferably in the presence of solvents which form azeotropes with the water formed during the condensation. Condensation is continued until the resins A have acid numbers of from about 25 to about 75 mg/g, at which point the Staudinger Index is from about 13.5 to 18 cm$^3$/g, preferably from 14.5 to 16.5 cm$^3$/g, in each case measured in dimethylformamide as solvent at 20° C. Following at least partial neutralization of the remaining carboxyl groups (with preferably from 10 to 80% of the carboxyl groups, with particular preference from 25 to 70%, being neutralized), the resins A are dispersible in water. During the condensation it may be observed that the initially cloudy reaction mass clarifies and forms a homogenous phase.

The oligoester B is preferably admixed to the resin A prior to neutralization and dispersion; however, it is also possible to incorporate the oligoester B into the finished dispersion. The addition of the curing agent, as well, to the resin A takes place preferably prior to neutralization and dispersion; however, it is also possible to add the curing agent to the aqueous dispersion before or after the addition of the oligoester B.

The ready-formulated dispersion may be adapted to the intended application by means of customary additives such as pigments, corrosion inhibitors, levelling agents, antisettling agents, adhesion promoters and defoamers.

For the formulation of surfacers, organic or inorganic fillers as well are added to the dispersion, such as carbon black, titanium dioxide, finely divided silica, silicates such as kaolin or talc, chalks, heavy spar (barium sulfate) or iron oxide pigments; organic fillers which may be used are ground thermoplastics such as polyolefins, polyesters or polyamides; preference is also given to polymers of olefinically unsaturated monomers that are obtainable by emulsion polymerization, including crosslinked polymers in particular.

The surfacer compositions may further comprise the customary solvents, especially water-miscible solvents. These surfacers are normally prepared by grinding the fillers and pigments with a portion of the dispersion and with the addition of dispersing auxiliaries, defoamers and other additives in appropriate dispersing equipment such as a bead mill. The particle size of the fillers and pigments is preferably reduced to less than 15 μm. The remainder of the dispersion and any further additives are added to this preparation in accordance with the target pigment/binder mass ratio of from 0.5:1 to 2.5:1. The mass of the pigments here also includes the mass of the fillers.

The finished formulation may be applied to the substrate by the customary techniques, such as by roller, by spraying or by roll coating. Particular preference is given to spraying application techniques, such as compressed air spraying, airless spraying or what is known as "ESTA high-speed rotation spraying". After a short flash-off time at room temperature or elevated temperature of up to about 80° C., the film is baked at from about 130 to about 190° C. The film thickness after baking is usually from about 15 to about 120 μm, preferably between 25 and 70 μm.

The addition of the low molar mass (oligomeric) polyester B brings about a markedly improved gloss of the baked film. Despite the fact that in the automotive coating system the surfacer film is coated with at least one further film (solid-color topcoat) or two further films (in the case of metallic paint: pigmented paint film containing color pigment and metallic effect pigment, and a clearcoat film), the markedly improved gloss of the surfacer film also has a substantial influence on the appearance of the finished coating system. The higher solids content which can be achieved by adding the polyester B results in a smaller amount of volatile fractions in the wet paint film and also in the paint film remaining after flashing off. The shrinkage in thickness on baking is therefore lower; this reduces the tendency to surface defects and irregular shrinkage of the paint film. The resistance to stone chipping is likewise unexpectedly improved.

The invention will be further illustrated by the following examples which are not intended to limit the scope of the invention as noted.

EXAMPLES

1 Preparing the Oligoester A (OE)

192 g of tripropylene glycol, 134 g of trimethylolpropane and 148 g of phthalic anhydride were placed in a glass flask and heated to 200° C., the water of reaction formed being separated off via a water separator. The esterification was continued at 200° C. until an acid number of 5 mg/g was reached.

2 Preparing the Water-insoluble Curing Agent B (HU)

105 g of methyl ethyl ketoxime and 0.1 g of dibutyltin dilaurate were heated to 80° C., during which the system was supplied with inert gas, and were admixed in portions with 255 g of ®Desmodur N 3390 (diisocyanate based on aliphatic polyisocyanate, mass fraction of NCO groups 19.4%). The reaction was exothermic and was continued until all of the isocyanate groups had reacted. The clear resin solution had a nonvolatile fraction (mass fraction of solids) of about 93%, the viscosity (diluted to a mass fraction of 58% of the resin in the solution with butyl glycol) was about 400 mPa·s at 23° C., measured in accordance with DIN EN ISO 3219.

3 Preparing the Carboxyl Component C (PCLM)

300 g of linseed oil were mixed with 100 g of maleic anhydride under a nitrogen atmosphere and the mixture was heated to 200° C. over 4 hours. The temperature of 200° C. was maintained until free maleic anhydride could no longer be detected. After cooling to 85° C., the batch was admixed with a mixture of 30 g of fully deionized (DI) water and 3 g of triethylamine and held until an acid number of 200 mg/g was reached. Subsequently, it was diluted with 85 g of methoxypropoxypropanol. The resulting resin solution had a nonvolatile fraction (mass fraction of solids) of approximately 80%.

4 Preparing the Carboxyl Component D (PCPU)

675 g of dimethylolpropionic acid, 180 g of ethyl glycol, 543 g of diglycol dimethyl ether and 271 g of methyl isobutyl ketone were weighed out into a reaction vessel with stirring, cooling and heating equipment and were heated to 100° C. At 100° C., 1044 g of tolylene di-isocyanate were added dropwise, account being taken of the exothermic reaction, and the temperature was maintained until the mass fraction of free isocyanate groups had fallen to below 0.1%. The batch was subsequently diluted with approximately 540 g of diglycol dimethyl ether and approximately 270 g of methyl isobutyl ketone. This gave a clear resin solution having a nonvolatile fraction (mass fraction) of 60% and an acid number of approximately 140 mg/g. The viscosity of a solution in diglycol dimethyl ether (46 g of the resin in 100 g of the solution) measured in accordance with DIN EN ISO 3219 at 23° C. was approximately 500 mPa·s.

5 Preparing the PH Component E (PHES1)

In an appropriate reaction vessel, 183 g of dipropylene glycol, 35 g of isononanoic acid, 68.5 g of pentaerythritol, 175 g of isophthalic acid and 0.5 g of dibutyltin dilaurate were esterified at 220° C. to an acid number of less than 5 mg/g. At 70° C., the batch was diluted with methyl ethyl ketone to a mass fraction of resin of 65% in the solution, and 60 g of tolylene diisocyanate were added. The temperature was held until free NCO groups were no longer detectable.

6 Preparing the PH Component F (PHES2)

106 g of tripropylene glycol, 87 g of hexanediol, 104 g of trimellitic anhydride and 0.2 g of dibutyltin dilaurate were esterified at 180° C. to an acid number of from 12 to 18 mg/g. At the end of the reaction, a solution in butyl glycol (55 g of resin in 100 g of solution in butyl glycol) had a viscosity of approximately 500 mPa·s, measured in accordance with DIN EN ISO 3219 at 23° C.

7 Preparing the Binder 1

70 g of component E (PHES1) and 30 g of component C (PCLM) were mixed. The mixture was condensed at a reaction temperature of 100° C. until an acid number of from 65 to 70 mg/g was reached. The viscosity of a solution in butyl glycol (40 g of resin in 100 g of solution), measured in accordance with DIN EN ISO 3219 at 23° C., was 450 mPa·s. 11 g of component A (oligoester OE) and 33 g of component B (water-insoluble curing agent HU) were subsequently added. After homogenization had been carried out, the batch was neutralized with dimethyl-ethanolamine and adjusted with DI water to a mass fraction of solids of 40%.

8 Preparing the Binder 2

80 g of component F (PHES2) and 20 g of component D (PCPU) were mixed and heated to 150° C. The solvent present was substantially removed by distillation under reduced pressure. The temperature of 150° C. was held until an acid number of from 31 to 36 mg/g and a viscosity of 450 mPa·s (measured on a solution of 45 g of resin in 100 g of solution in butyl glycol in accordance with DIN EN ISO 3219 at 23° C.) were reached. After cooling to 100° C., the batch was mixed with 25 g of component A (oligoester OE) and 33 g of component B (water-insoluble HU). The batch was subsequently neutralized with dimethylethanolamine and adjusted using DI water to a mass fraction of solid of 40%.

9 Preparing the Binder 3

80 g of component F (PHES2) and 20 g of component D (PCPU) were mixed and heated to 150° C. The solvent present was substantially removed, by distillation under reduced pressure. The temperature of 150° C. was held until an acid number of from 31 to 36 mg/g and a viscosity of 450 mPa·s (measured on a solution of 45 g of resin in 100 g of solution in butyl glycol in accordance with DIN EN ISO 3219 at 23° C.) were reached. After cooling to 100° C., the batch was mixed with 11 g of component A (oligoester OE). The batch was subsequently neutralized with dimethylethanolamine and adjusted using DI water to a mass fraction of solids of 35%.

10 Preparing the Binder 4

80 g of component F (PHES2) and 20 g of component D (PCPU) were mixed and heated to 150° C. The solvent present was substantially removed, by distillation under reduced pressure. The temperature of 150° C. was held until an acid number of from 31 to 36 mg/g and a viscosity of 450 mPa·s (measured on a solution of 45 g of resin in 100 g of solution in butyl glycol in accordance with DIN EN ISO 3219 at 23° C.) were reached. After cooling to 100° C., the batch was mixed with 17.5 g of component A (oligoester OE) and 7.5 g of component B (water-insoluble curing agent HU). The batch was subsequently neutralized with dimethylethanolamine and adjusted using DI water to a mass fraction of solids of 35%.

Testing the Binders of the Invention as Automotive Surfacers

Binders 1 to 4 (BM 1 to BM 4) as per above Examples 7 to 10 were formulated as automotive surfacers. The composition is evident from Table 1 below (masses of the constituents in g):

TABLE 1

|  | Surfacer 1 | Surfacer 2 | Surfacer 3 | Surfacer 4 |
| --- | --- | --- | --- | --- |
| BM1 | 237.5 | — | — | — |
| BM2 | — | 232.5 | — | — |
| BM3 | — | — | 228.6 | — |
| BM4 | — | — | — | 228.6 |
| Hydrophilically mod. blocked isocyanate* | — | — | 25.0 | 16.7 |
| Water-dilutable amino resin+ | 5.2 | 7.4 | 5.2 | 10.5 |
| Titanium dioxide (rutile) | 50 | 50 | 50 | 50 |
| Barium sulfate | 40 | 40 | 40 | 40 |
| Micronized talc | 10 | 10 | 10 | 10 |
| Carbon black pigment | 0.2 | 0.2 | 0.2 | 0.2 |
| Deionized water | 57 | 60 | 41 | 44.2 |

*Hydrophilic aliphatic polyisocyanate based on hexamethylene diisocyanate (®Bayhydur 3100), diluted with DI water to a mass fraction of solids of 60%
+Melamine resin, partially etherified with methanol, having a degree of polymerization of about 2.3, aqueous solution with a mass fraction of solids of 95%

The coating materials had a mass fraction of solids of approximately 50%, a pH of about 8.0 (adjusted by means of dimethylethanolamine) and a viscosity of about 120 mPa·s at 20° C.

Using a compressed-air gun, the surfacers were applied to a zinc-phosphatized steel panel coated with a cathodic electrodeposition primer (about 20 μm). The surfacers were cured in a forced-air oven for 20 minutes at 130° C. or 150° C. or 190° C. In all cases, a dry film thickness of 35±2 μm was obtained. Over the surfacer coat, a commercially customary alkyd resin automotive top coat material was applied which was cured at 135° C. for 30 minutes (dry film 35±2 μm). The resistance properties of the films (solvent resistance, water resistance) and also the mechanical values corresponded to the requirements of practice for all of the coatings. The stone-chip resistance was tested using the stone-chip tester in accordance with the VDA [German Automakers' Association] (from Erichsen, Model 508) at +20° C. using 1 kg of steel shot (angular, average diameter 4 to 5 mm, blasted with compressed air at 0.3 MPa (3 bar)). The topcoat adhesion (0=no flaking of the topcoat from the surfacer, 10=no adhesion between topcoat and surfacer) and also the number of strikethroughs (0=no strikethrough, 10=very large number of strikethroughs) were evaluated in the customary manner. Furthermore, testing was carried out with the stone impact simulator "SPLITT" (Single Projectile Launching Impact Tester). The latter method is described in detail in the journal Farbe und Lack, No. 8, pages 646 to 653 (1984). The baking temperature for the surfacer in this case was 160° C., the impact angle 5° and the ball diameter 2 mm with a mass of 0.5 g. The impact speed chosen was 180 km/h. The test specimens were tested at +20° C. and at −20° C. Table 2 states the (substantially circular) damage area in mm² and the coat exposed at the damage site (B=metal panel, G=primer, F=surfacer).

In order to determine the gloss, the coating materials of Table 1 were drawn down onto a glass plate using a drawing cube (gap width 150 μm) and after flashing off at room temperature (10 minutes) were cured in a forced-air oven at 170° C. The gloss of these plates was determined in accordance with DIN 67 530 at an angle of 20°.

The results of testing are summarized in Table 2 below.

It is evident that in both, different tests the stone-chip resistance of the surfacers of the invention is markedly better than that of the comparative surfacers. The gloss is also much greater for the surfacer of the invention. This improvement is also manifested through the overlying topcoat.

TABLE 2

| Automotive surfacers based on binder | BM1 | BM2 | BM3 | BM4 | Comparative: Ex. 4 from EP-B 0 594 685 | Comparative: Ex. 2 from EP-B 0 548 873 |
|---|---|---|---|---|---|---|
| VDA stone-chip test | | | | | | |
| Topcoat adhesion | 3 | 2 | 1 to 2 | 1 to 2 | 3 | 2 to 3 |
| Strikethroughs | 2 | 2 | 2 | 1 to 2 | 3 | 2 to 3 |
| "SPLITT" at +20° C. | 4 to 5/G/F | 2 to 4/G | 3 to 4/G | 2/G | 10/B/G | 6/G/F |
| "SPLITT" at −20° C. | 5 to 6/G/F | 3 to 5/G | 3 to 5/G | 2 to 3/G | 12/B/G | 6/G/F |
| Gloss at 20° in % | 65 | 63 | 67 | 68 | 55 | 50 |

What is claimed is:

1. An aqueous coating composition comprising a condensation product A having a Staudinger Index of from 10 to 20 cm$^3$/g, and an acid number of from 25 to 75 mg/g, of a carboxyl group-containing resin A1 and a hydroxyl group-containing resin A2, in which condensation product A, from 10 to 80% of the carboxyl groups are neutralised, and a curing agent C which becomes active only at an elevated temperature of at least 80 ° C., with the proviso that at least 20% of the mass of the curing agent C is insoluble in water, wherein said coating composition further comprises a low molar mass polyester B having a hydroxyl number of from 100 to 450 mg, an acid number of less than 6 mg/g, and a Staudinger Index of from 2.5 to 6 cm$^3$/g obtained by condensing aliphatic polyols B1 and aliphatic, cycloaliphatic or aromatic polycarboxylic acids B2, the average functionality (number of the hydroxyl groups and/or acid groups per molecule) of component B1 being greater by at least 0.2 than that of component B2.

2. The coating composition as claimed in claim 1, wherein the condensation product A has an acid number of from 30 to 50 mg/g.

3. The coating composition as claimed in claim 1, wherein the component A1 has an acid number of from 100 to 230 mg/g.

4. The coating composition as claimed in claim 1, wherein the component A2 has a hydroxyl number of from 50 to 500 mg/g.

5. The coating composition as claimed in claim 1, wherein the curing agent C is a blocked polyfunctional isocyanate.

6. The coating composition as claimed in claim 1, wherein the curing agent C is a mixture of a blocked polyfunctional isocyanate C1 and a water-dilutable amino resin C2.

7. The coating composition as claimed in claim 1, wherein the curing agent C is a mixture of a blocked polyfunctional isocyanate C1, a hydrophilically modified blocked polyfunctional isocyanate C11 and a water-dilutable amino resin C2.

8. The coating composition as claimed in claim 1, wherein from 60 to 95% of the carboxyl groups of the resins A have been neutralized.

9. A process for preparing a coating composition as claimed in claim 1, which comprises preparing from the carboxyl group-containing resins A1 and from the hydroxyl group-containing resins A2, and the polycondensation conditions, a resin A whose remaining carboxyl groups are neutralized to the extent of from 60 to 95%, dispersing the neutralized resin A in water, the low molar weight polyester B being added to the resin A before or after the neutralization, but before dispersing in water, and mixing the aqueous dispersion with the curing agent C prior to application.

10. A method of using of a coating composition as claimed in claim 1 by applying the same to metallic substrates to produce surfacer films thereon.

* * * * *